United States Patent Office 3,061,147
Patented Oct. 30, 1962

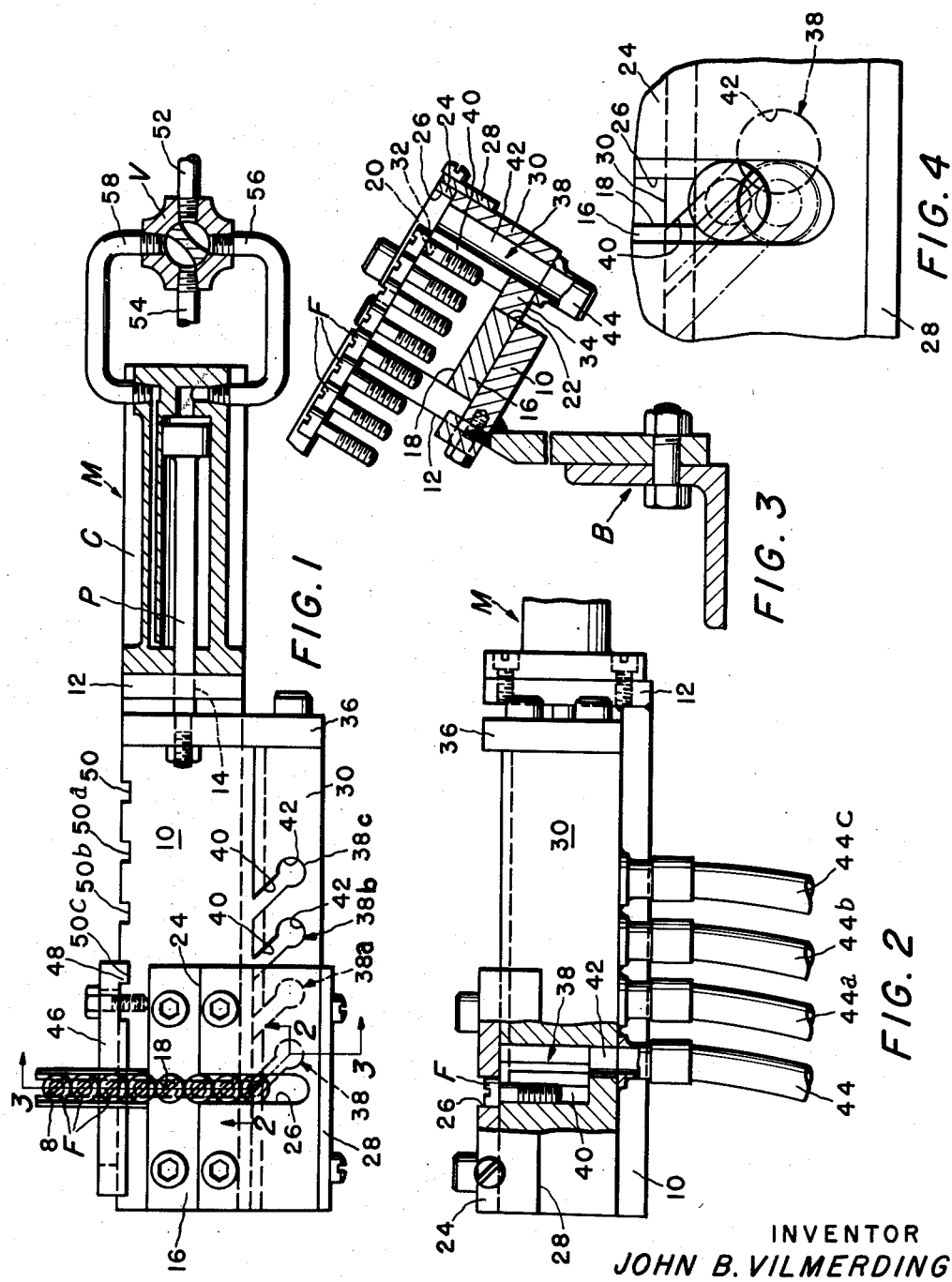

3,061,147
ESCAPEMENT MECHANISM FOR FASTENERS
John B. Vilmerding, Moorestown, N.J., assignor to Ingersoll-Rand Company, New York, N.Y., a corporation of New Jersey
Filed Aug. 19, 1959, Ser. No. 834,690
4 Claims. (Cl. 221—268)

This invention relates to escapement mechanisms incorporated in delivery arrangements for fasteners and more specifically for incorporation on machines having multiple driving heads.

An object of this invention is to provide an escapement mechanism for incorporation in a fastener delivery arrangement for use with a multiple fastener driving machine having a single source of supply.

Another object of this invention is to provide means having a single supply source, adapted to deliver a single fastener to each operative driving head of a multi-fastener driving machine.

This invention generally relates to an escapement mechanism for distributing fasteners to a plurality of locations or stations from a single chute extending laterally across a receiver. A slide or head member is movably mounted on the receiver to travel across the outlet end of the chute in a direction substantially perpendicular to the chute and contains a series of slots therein for sequentially receiving fasteners from said chute during the movement of the slide along the receiver. Each of the slots has a mouth end and an exit end and is located so that the outlet end of the chute intercepts the slot between its mouth and exit ends during the movement of the slide. Further, each slot is inclined so that its mouth end precedes its exit end during the movement of the slide in the fastener dispensing direction whereby, after a fastener enters the mouth end of the slot, further movement of the slide causes the inclined walls of the slot to cam the fastener along the remainder of the chute and out of the outlet end of the chute. Separate conveyor means, such as tubes, can be attached to the slide at the exit end of each slot for receiving fasteners from the slots and carrying them to stations where they are to be used.

These and other objects will become apparent by reference to the following description and accompanying drawings wherein:

FIGURE 1 is a plan view of an escapement mechanism in accordance with the invention including a sectional showing of a fluid power system, conventionally shown, for operating the mechanism, FIG. 2 is an elevational view of the mechanism of FIG. 1 having a portion removed therefrom generally in the plane of line 2—2 of FIG. 1, FIG. 3 is a sectional view taken on line 3—3 of FIG 1, and FIG. 4 is an enlarged plan view of a portion of the mechanism of FIG. 1 showing the cooperation of the various parts.

The escapement mechanism as shown in the drawings is capable of delivering headed fasteners to a machine having four driving heads. However, it should be realized that the capacity may be increased for use with machines having more driving heads and is limited for convenience of disclosure and description.

The escapement mechanism has a mounting plate 12 with an opening 14 attached to a base 10. Bolted to the top of the base 10, at the end remote from the plate 12, is a receiver 16 having a chute 18 extending across the width of the mechanism. The chute 18 receives the shank portions of the fasteners F while the head portions ride on the top surface of the receiver 16. The feed chute 8 receives the fasteners F from a single supply source (not shown) and is connected to the receiver 16 in alignment with the chute 18. An upper groove 20 and a lower groove 22 extend the full length of the receiver 16 and are formed by eliminating the corners on the back side thereof thereby forming a central tongue portion on the receiver. A cap plate 24 is bolted to the top of and overhangs the receiver 16. The cap plate 24 has an enlarged retaining slot 26 being just large enough to receive the head of the fasteners F and is aligned with and forms an extension of the chute 18. A retaining plate 28 is bolted to the free side of the cap plate 24 and with the cap plate 24 and the tongued side of the receiver 16 forms a track. A head member 30 has an upper flange 32 and a lower flange 34 received in the upper and lower grooves 20 and 22, respectively, and is slidably retained in the previously described formed track. A connecting plate 36 is bolted to the end of the head 30 adjacent to the end of the base 10 mounting the plate 12 and has an opening therethrough for the reception of the end of a piston rod of a motor M.

A double acting fluid motor M (diagramamtically shown) is mounted on the plate 12 and is comprised of a cylinder C and a piston P; the rod of the piston extending through the opening 14 in the mounting plate 12 and being connected to the plate 36. A valve V (diagrammatically shown) has an inlet 52, an outlet 54 and two motor conduits 56 and 58 which connect to the two motor chambers of the motor M. The valve V is adapted to alternately connect the motor conduits 56 and 58 to the inlet and outlet passages 52 and 54, respectively, to drive the piston P in the cylinder C and thus move the head 30 back and forth along the length of the escapement mechanism.

The head 30 has a series of keyhole type slots 38, 38a, 38b, and 38c which are angularly disposed relative to the chute 18 and the slot 26 and also to the path of movement of the slide member. Since each of the keyhole slots 38 are a duplication of one another, only one will be described. The neck or mouth portion 40 of the keyhole slot 38 is open to the front side of the head 30 adjacent to the receiver 16 and is approximately the same width as the chute 18 and the shank portion of the fasteners F. The top surface of the head 30 is flush with the top surface of the receiver 16 and as the fastener shank enters the mouth portion 40, the head rides on the top surface of the slide. The terminal or enlarged portion 42 of the slot 30 is of the same diameter as the width of the slot 26 and extends completely through the slide 30 to provide a dropway or escape passage for the fastener.

Connected to the bottom of the slide 30 is a series of delivery chutes or tubes 44, 44a, 44b and 44c which are aligned with the terminal portions of the keyhole slots 38, 38a, 38b and 38c, respectively. As the fasteners enter the various slots they will be positively delivered to the terminal portions 42, and, when the terminal portion is fully aligned with the slot 26 the fastener will drop through the head 30 into the associated chute 44 to be delivered to the respective driving head of the machine. As may be seen in FIG. 3, the base 10 of the escapement mechanism has a bracket portion B for mounting on the machine. It will be noted that the escapement device and the chutes 8, 44, 44a, 44b and 44c are all positioned on an incline thus gravity provides the impetus for movement of the fasteners through the delivery system. However, other driving means may be used.

In some cases the work to be accomplished by the fastener driving machine does not require the use of all of the heads. When this occurs, fasteners must be delivered only to the spindles being used. This is accomplished by the use of a slide stroke limiting arrangement which permits alignment of those slots required to feed the machine driving heads being used. This is conventionally shown in FIG. 1 wherein the base 10 has a series of slots 50, 50a, 50b and 50c in the front face thereof adapted to receive a tongue 48 of an adjustable stop 46 held in position by bolting to the base. As shown in the drawings, the stop 46 is now positioned to permit the head 30 to pick up a fastener in each of the slots 38. Thus the motor M will drive the head 30 along the length of the base 10 until the plate 36 abuts the end of the stop 46. When this occurs, one fastener has entered each of the keyhole type slots 38. Should only two spindles be in use, the stop 46 would be moved until the tongue 48 was seated in the slot 50a and then be bolted back onto the base 10. Thus, the plate 36 would abut the end of the stop 46 after only two keyhole slots, namely 38 and 38a, have been registered with the chute 18 and the slot 26. At that point, the motor M would be reversed and returned to its initial position with all the keyhole slots 38 to the right of the slots 18 and 26.

The supply chute 8, the chute 18 and the slot 26 extend across the width of the base 10. The head 30 moves along the length of the base 10 while the keyhole slots 38 are positioned angularly to both the path of movement of the head 30 and the path provided by the chutes 8 and 18 and the slot 26. Initially, a series of fasteners F are positioned within the chutes 8 and 18 and, the beginning part of the slot 26 being stopped by the front surface of the head 30 adjacent the receiver 16. As the slide 30 commences to move to the left (relative to the drawings) the mouth portion 40 of the slot 38 will register with the chute 18 of the receiver 16 and the lead fastener will start to enter the first keyhole slot. Referring more specifically to FIG. 4, the slot 26 in the cap plate 24 engages the fastener head thus preventing the fastener F from moving along the length of the escapement mechanism with the head 30 after leaving the receiver 16. However, as the head 30 continues to advance, the fastener simultaneously progresses into the keyhole type slot 38 and the slot 26 until it enters the enlarged terminal portion 42 now fully aligned with the slot 26. The fastener F will then drop through the head 30 into the associated delivery chute 44. As the slide 30 advances causing the received fastener to progress into the keyhole slot 38 and the slot 26, the mouth portion 40 of the slot 38 simultaneously moves out of register with the chute 18 in the receiver 16 and the trailing surface of the slot cuts off the entrance of any additional fasteners.

Having described my invention, I claim:

1. An escapement mechanism for distributing fasteners to a plurality of stations from a single source, said mechanism comprising: a receiver member containing a fastener chute extending laterally across said receiver and adapted to contain and guide a row of fasteners, said chute having inlet and outlet ends for respectively receiving and discharging fasteners from it; a head member mounted on said receiver member for movement, relative to said receiver member, across the outlet end of said chute in a direction substantially perpendicular to said chute; a series of slots in said head member adapted for sequentially receiving fasteners from said chute as said head member moves across said outlet end of said chute in a given fastener dispensing direction; each of said slots having a mouth end and an exit end with the mouth end being located to intercept said chute between the inlet and outlet ends of said chute as said head member moves relative to said receiver member; each of said slots having walls inclined in said given dispensing direction from its exit to its mouth ends so that after the mouth end of said slot initially receives a fastener resting in said chute, further movement of said head member in said given fastener dispensing direction causes the inclined walls of the slot to cam the fastener along the remaining portion of the chute to its outlet end; and said outlet end of said chute being located to intercept each of said slots between the mouth and exit ends of the slot so that a fastener is discharged from the chute after it passes through the mouth end of the slot and before it arrives at the exit end of the slot.

2. The escapement mechanism of claim 1 wherein said chute has a portion which overlaps the path of said slots as said head member moves relative to said receiver member.

3. The mechanism of claim 1 including separate conveyor means mounted on said head member at the exit ends of said slots for receiving fasteners from said slots and conveying them to a plurality of stations, said conveyor means being movable with said head member relative to said receiver member.

4. An escapement mechanism for distributing fasteners to a plurality of stations from a single source, said mechanism comprising: a receiver containing a fastener chute extending laterally across said receiver and adapted to contain and guide a row of fasteners resting therein, said chute having an outlet end for discharging the fasteners from the chute; a slide movably mounted on said receiver to travel across the outlet end of said chute in a direction substantially perpendicular to said chute; said slide containing a series of slots adapted to sequentially receive fasteners from said chute as said slide moves on said receiver in a given direction; each of said slots having a mouth end and an exit end and being located so that said outlet end of said chute intercepts each slot between its mouth and exit ends during the travel of the slide on the receiver; each of said slots being angled relative to said chute so that, during the movement of said slide in said given direction, the mouth end of the slot precedes its exit end and initially engages a fastener in said chute; and separate conveyor means attached to the exit end of each slot for receiving a fastener from that slot and conveying it to a fastener applying station.

References Cited in the file of this patent

UNITED STATES PATENTS

| | | |
|---|---|---|
| 1,002,421 | McFeely | Sept. 5, 1911 |
| 1,002,422 | McFeely | Sept. 5, 1911 |
| 1,129,882 | McFeely | Mar. 2, 1915 |
| 1,941,992 | Makenny | Jan. 2, 1934 |
| 2,179,755 | Newman | Nov. 14, 1939 |
| 2,865,156 | Wolfson | Dec. 23, 1958 |